Nov. 7, 1944.  H. E. PRUITT  2,361,961
UNIVERSAL CUTTING MACHINE
Filed Aug. 21, 1942  4 Sheets-Sheet 1
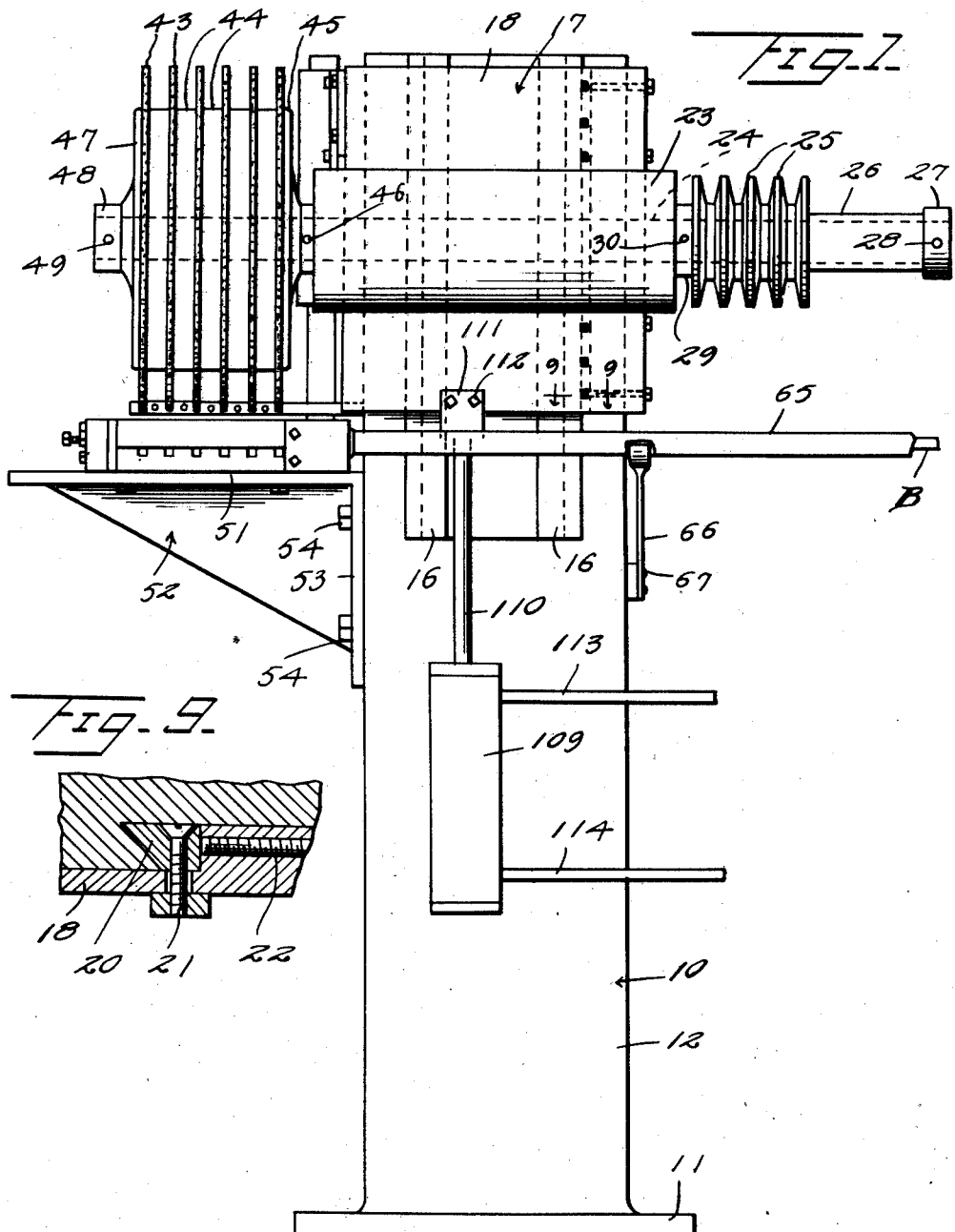

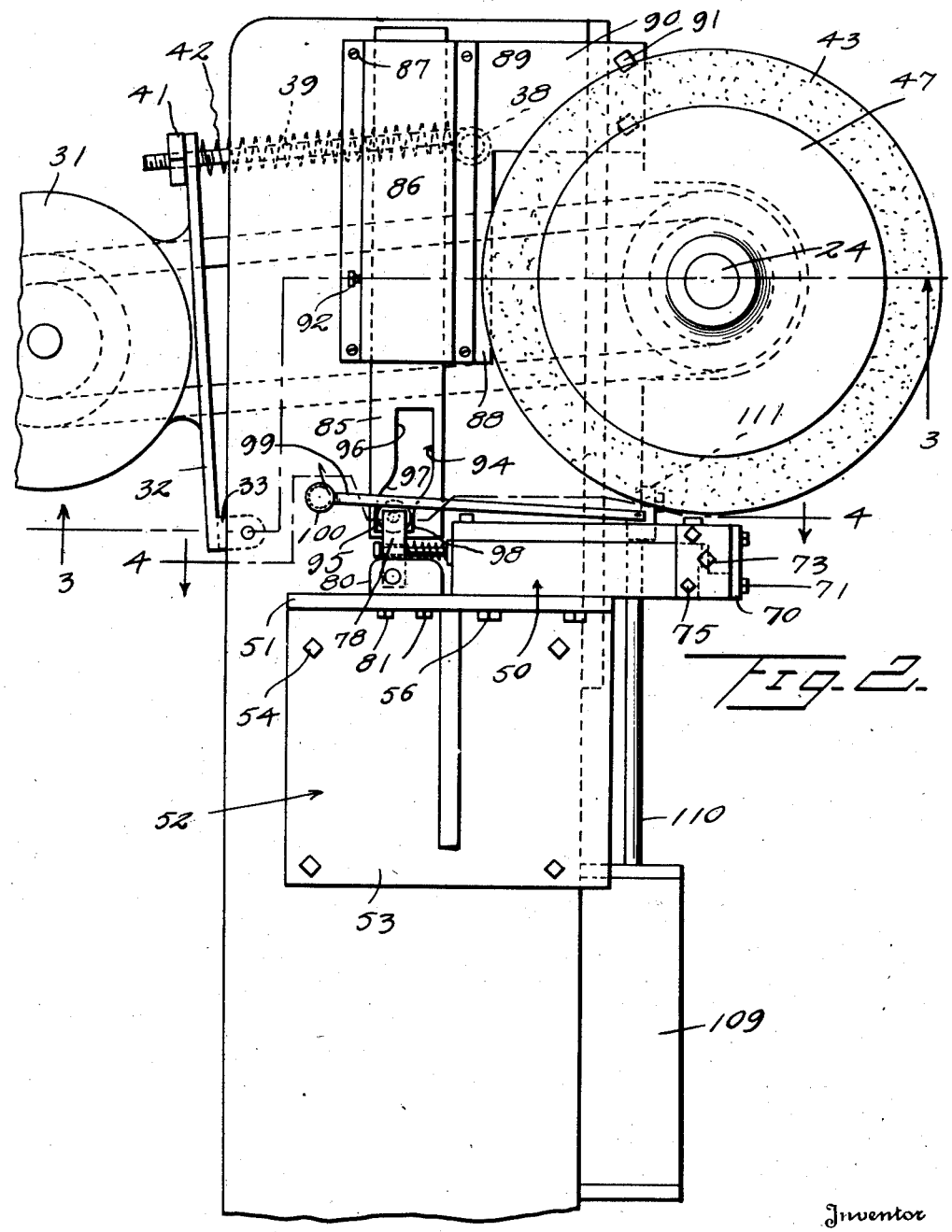

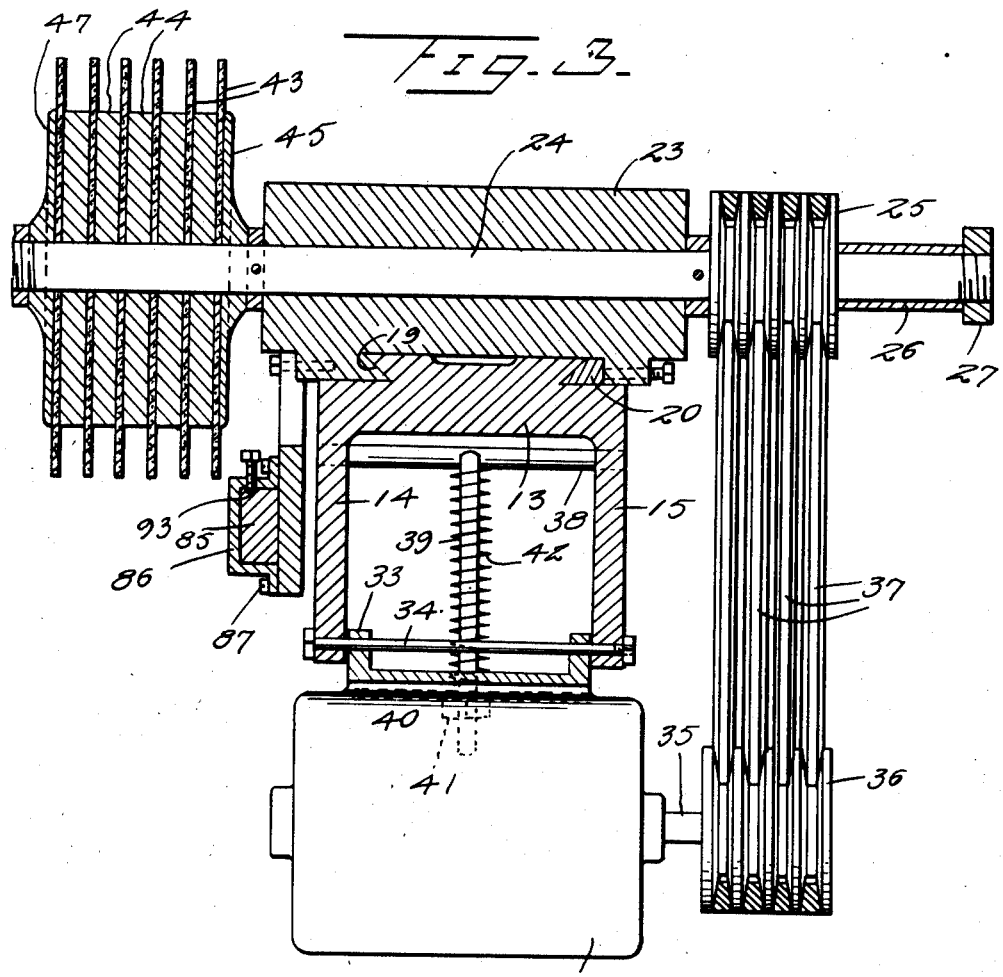
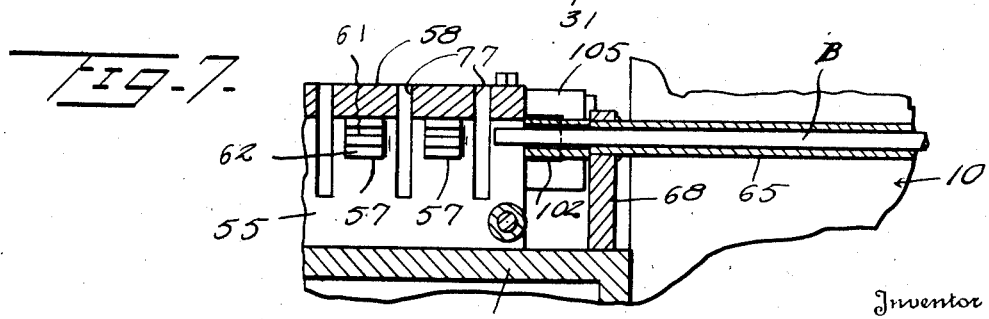

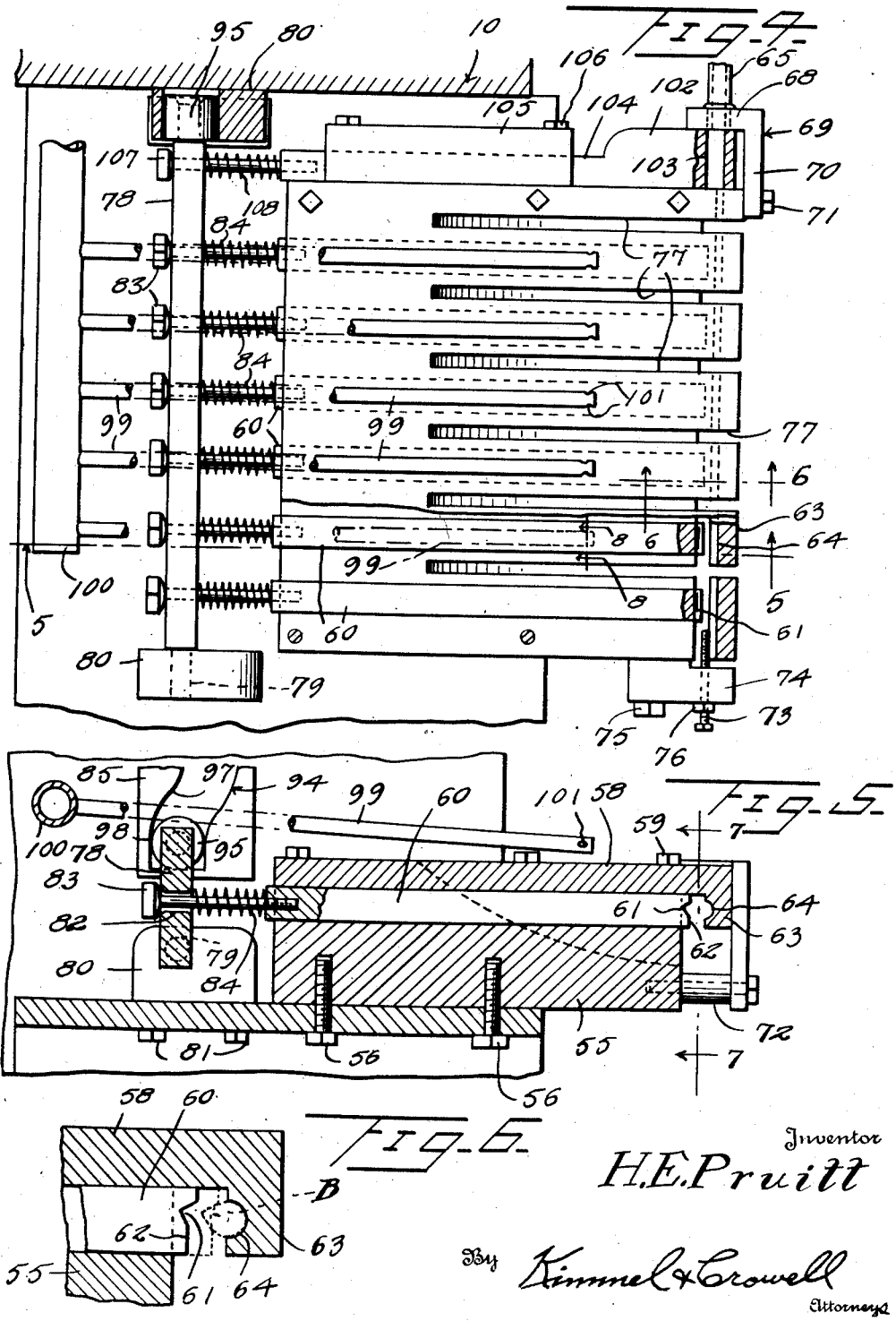

Patented Nov. 7, 1944

2,361,961

UNITED STATES PATENT OFFICE 2,361,961

UNIVERSAL CUTTING MACHINE

Harvey E. Pruitt, Flint, Mich., assignor, by mesne assignments, to Emery M. Rice, Hanna, Ind.

Application August 21, 1942, Serial No. 455,664

15 Claims. (Cl. 51—98)

This invention relates to a machine for cutting a bar of steel or other metal into predetermined lengths.

An object of this invention is to provide a bar cutting machine for making multiple cuts through the bar to thereby cut multiple pieces therefrom in a single operation.

Another object of this invention is to provide in a machine of this kind an improved automatically operable clamping means for holding the bar during the cutting operation, the clamping means being so constructed as to grip the bar between the cutters so that any variation in the diameters of the cutters, which will result in certain portions of the bar being cut entirely through before the other portions, will not cause the bar to become loose.

A further object of this invention is to provide an automatically operable clamping means which is moved to a clamping position during the initial movement of the cutters on the cutting cycle.

A further object of this invention is to provide an improved clamping means for clamping the bar during the cutting cycle, the clamping means being so constructed as to automatically release the cut bar pieces when the cutting cycle has been completed.

A further object of this invention is to provide a machine of this kind which is simple in construction and which may have the cutting cycle performed by means of a hydraulic operator.

A further object of this invention is to provide a machine of this kind wherein interchangeable clamping means may be used for varying the lengths of the bar pieces, the cutters being also spaced apart in a manner whereby the spacing may be varied to correlate with selected clamping means.

A further object of this invention is to provide a machine of this kind in which the work is held stationary and the cutters are moved toward and away from the work.

A further object of this invention is to provide in a machine of this kind an improved means for discharging a cutting fluid onto the cutters and the work.

With the foregoing objects and others which may hereinafter appear, the invention consists of the novel construction, combination and arrangement of parts as will be more specifically referred to and illustrated in the accompanying drawings, wherein is shown an embodiment of this invention, but it is to be understood that changes, variations and modifications may be resorted to which fall within the scope of the invention as claimed.

In the drawings:

Figure 1 is a detail front elevation of a cutting machine constructed according to an embodiment of this invention, Figure 2 is a fragmentary side elevation of the device, Figure 3 is a sectional view taken on the line 3—3 of Figure 2, Figure 4 is a sectional view taken on the line 4—4 of Figure 2, Figure 5 is a fragmentary sectional view taken on the line 5—5 of Figure 4, Figure 6 is a fragmentary sectional view taken on the line 6—6 of Figure 4, Figure 7 is a fragmentary sectional view taken on the line 7—7 of Figure 5, Figure 8 is a sectional view taken on the line 8—8 of Figure 4, and Figure 9 is a fragmentary sectional view taken on the line 9—9 of Figure 1.

Referring to the drawings, the numeral 10 designates generally a standard which is formed with a base 11 and an upright 12, the upright 12, as shown in Figure 3, being U-shaped in horizontal section and having the bight 13 thereof forming the front wall of the standard with the parallel legs 14 and 15 forming the opposite sides of the standard. The bight 13 on the outer side thereof is formed with a pair of parallel vertically disposed guides 16 which are formed integral with the bight or front wall 13 and a slide generally designated as 17 is adapted to slidably engage the guides 16. The slide 17 is formed of a body plate 18 which is provided on the inner face thereof with a channel or keyway 19 within which the guides 16 are adapted to slidably engage.

A shim 20 engages one of the guides 16 being secured to the body 18, as shown in Figure 9, by fastening devices 21. The shim 20 is adjusted inwardly with respect to the body 18 by means of adjusting bolts 22. The body 18 has formed integral therewith a horizontally disposed bearing 23 which extends forwardly from the body 18 and a spindle or cutter shaft 24 is journalled through the bearing 23. The spindle or shaft 24 has secured thereto adjacent one end of the bearing 23 a multiple pulley 25 for receiving a plurality of V-shaped driving belts. A cylindrical sleeve 26 is mounted about the spindle or shaft 24 and an annular nut 27 which is formed with one or more recesses 28 for receiving a spanner wrench is threaded onto the adjacent end of the shaft 24 so as to tighten the sleeve 26 against the pulley 25.

An inner thrust washer or sleeve 29 is fixed by means of a transverse key pin 30 to the shaft 24 between the inner end of the pulley 25 and the adjacent end of the bearing 23. A driving motor 31 is disposed on the rear side of the standard 12 and is provided with a base plate 32. The plate 32 at its lower portion is formed with a pair of right angularly disposed inwardly projecting ears 33 through which a supporting shaft 34 is adapted to engage. The ears 33 are disposed between the parallel legs 14 and 15, as shown in Figure 3, and the shaft or bolt 34 rockably supports the lower portion of the base 32 of the motor 38. The motor shaft 35 has secured thereto a multiple pulley 36, and a plurality of V-shaped belts 37 are trained about the two pulleys 25 and 36.

In order to provide a means whereby the belts 37 may be kept taut, I have provided a belt tensioning means including a transversely disposed shaft or pipe 38 which is fixed between the two parallel sides 14 and 15 adjacent the upper portions thereof. A rearwardly projecting bolt or arm 39 is fixed to the center of the shaft 38 and extends through an opening 40 which is formed in the base 32. A nut 41 is threaded onto the bolt or arm 39 and a spring 42 is interposed between the inner side of the base 32 and the supporting shaft 31, engaging about the arm or bolt 39.

The opposite end portion of the shaft or spindle 24 has mounted thereon a plurality of spaced apart cutting discs 43 which are held in spaced apart relation by means of spacers 44. The cutters 43 are here shown as abrasive cutters or discs, but it will be understood that these cutters 43 may be circular saws or other circular cutting members. An inner plate 45 is fixed by means of a key pin 46 on the shaft 24 and an outer face plate 47 is mounted on the shaft 24 and bears against the outermost of the cutting members 43. A nut 48 is threaded on the shaft 24 and may be of annular construction and provided with one or more recesses 49 for receiving a spanner wrench or the like. The widths or thicknesses of the spacers 44 determine the lengths of the pieces which are to be cut from a metal bar held in a clamping device disposed below the cutting members 43 and to be hereinafter described.

A clamping device, generally designated as 50, is disposed below the cutting members 43 and is mounted on the horizontal upper side 51 of a bracket 52. The bracket 52 has a vertical side 53 which is secured by fastening devices 54 to the outer side of the side member 14. The clamping device 50 comprises a base plate or block 55 which is secured by fastening members 56 to the upper side of the bracket 52. The block or plate 55 is formed with a plurality of spaced apart substantially square slots 57 which open through the upper side thereof and the top plate 58 is secured by fastening members 59 to the upper side of the base plate 55 and is adapted to close the guide openings or slots 57.

An elongated movable clamping member 60 is slidable in each slot or guide 57 and is formed at its forward end with a V-shaped recess 61. The forward end of the movable clamping member 60 also has a rearwardly offset lower portion 62 extending downwardly from the recess 61 so that when the movable clamping member 60 is moved to a released position, the severed bar piece may readily drop downwardly into a suitable receiver. The top plate 58 extends forwardly beyond the forward edge of the base 55 and has formed integral therewith a depending stationary clamping jaw 63. The jaw 63 on its rear side has a recess 64 confronting the recess 62 so that the bar B or article which engages between the two jaws 60 and 63 will be firmly gripped in the confronting clamping surfaces or recesses 61 and 64.

The bar or rod B is supported in a tubular support 65 which is secured to a supporting bracket 66, the latter being fixed by fastening devices 67 to the upright 12. The end of the guide or support 65 is welded or otherwise fixedly secured to a rearwardly projecting leg 68 of an L-shaped supporting member 69. The supporting member 69 has a forward leg 70 which extends in parallel relation to the forward side of the block 55 and is secured to the block 55 by a fastening device 71. Preferably, a spacer 72 is interposed between the forward leg 70 and the adjacent or forward edge of the block or plate 55. The rod or bar B is adapted to be moved endwise through the tubular support 65 and is limited in its forward movement by means of an adjustable limit screw 73 which is threaded through a plate 74 secured by fastening devices 75 to the side edge of the plate or block 55. The limit screw 73 may be locked in adjusted position by means of a lock nut 76. The screw 73 is adapted to be disposed in axial alignment with the bar or rod B and engaged between the confronting clamping members 60 and 63.

The block or plate 55 and the cover or top plate 58 are formed with upwardly opening slots 77 within which the cutting members 43 are adapted to loosely engage when the slide member 17 is lowered to a cutting position. The movable clamping members 60 are disposed between adjacent pairs of cutting slots 77 so that the movable clamping members 60 will tightly hold the bar or rod B during the cutting operation, and after the bar or rod has been completely severed in the several positions by means of the cutting members 43.

In order to provide a means whereby the several movable clamping members may be moved to a clamping position during the initial downward movement of the slide 17, I have provided an elongated bar 78 which is pivotally supported on a pair of trunnions 79 carried by bearings 80. The bearings 80 are secured by fastening devices 81 to the horizontal bracket side 51 rearwardly of the base member 55. The elongated bar or rock member 78 is provided with a plurality of spaced openings 82 through which headed adjusting bolts 83 are adapted to loosely engage. The bolts 83 are threaded into the rear ends of the movable clamping members 60, as shown in greater detail in Figure 5, and a spring 84 is disposed about the shank of each bolt 83 and interposed between the rear end of a clamping member 60 and the forward side of the pressure bar 78. The pressure bar 78 is rocked to move the movable clamping members 60 to either a clamping or released position by means of a vertically disposed elongated cam bar 85. The bar 85 is adjustably secured in a socket 86 secured by fastening devices 87 to the vertical side 88 of an L-shaped plate 89.

The plate 89 has a horizontal side 90 which is secured by fastening devices 91 to the adjacent edge of the plate 18. The cam member 85 is vertically adjusted in the socket 85 by means of a set screw 92 which is adapted to engage in a selected one of a series of recesses 93 which are formed in the adjacent side of the cam member 85. The cam member 85 is formed in the lower portion thereof with a cam track 94 and the track 94 has movably mounted therein a roller 95 which is rotatably carried by the adjacent or inner end of the pressure bar 78. The cam track 94 includes an elongated vertically disposed dwell track 96, an inclined track 97 and a relatively short vertical track 98. The vertical track 98 is parallel with the vertical track 96, but is offset rearwardly therefrom so that when the roller 95 is within the vertical track portion 98, the movable clamping member 60 will be in a released position. When the roller 95 is in the long cam track 96 the movable clamping member 60 will be in a clamping position and will be placed under tension by means of the pressure bar 78 bearing against the several springs 84.

The track 96 is of sufficient length to maintain the clamping members 60 in a clamping position during substantially the major portion of the downward movement of the slide 17, and particularly when the cutting members 43 are performing their cutting operation.

In order to provide a means whereby a cutting fluid may be discharged onto the cutting members 43, I have provided a plurality of fluid discharging nozzles or pipes 99 which are disposed between pairs of cutting members 43. The nozzles or pipes 99 are secured at their rear ends to a fluid conducting pipe 100 which may be connected to a suitable source of fluid supply. The nozzle members 99, as shown in Figure 8, are each provided adjacent their forward ends with diametrically opposed jet openings 101 through which the liquid is adapted to be discharged. The forward ends of the nozzle members or pipes 99 are preferably closed so that the cutting fluid will only be discharged against the adjacent sides of the cutting members 43.

When the pressure bar 78 is rocked forwardly to a pressure applying position for moving the movable clamping members 60, the bar 78 is also adapted to move a bar locking member 102 forwardly to a locked position. The locking member 102 is formed with an opening 103. The locking member 102 is interposed between the tubular supporting arm 68 and the adjacent or inner end of the base member 55. The locking member 102 coacts with the adjacent end of tubular support 65 and the arm 68 in tightly locking the bar B against endwise movement, particularly during the cutting operation. The locking member 102 is formed with an elongated slide member 104 which is slidable through a channel-shaped guide 105 secured as by fastening devices 106 to the inner end of the block or base 55. The rear end of the slide or stem 104 has secured thereto a headed bolt 107 which engages loosely through the pressure bar 78. A spring 108 is interposed between the rear end of the slide or stem 104 and the forward side of the pressure bar 78.

In order to provide a means whereby the slide member 17 may be vertically reciprocated to an uppermost released or non-cutting position, or a lowermost cutting position, I have provided a hydraulic slide operating member 109 which is fixed to the forward side of the front wall 13. The hydraulic member 109 includes a piston rod 110 having a head 111 at its upper end which is secured by fastening devices 112 to the lower end of the slide 17. The hydraulic member 109 is adapted to be connected by means of pipes 113 and 114 to a suitable source of fluid pressure supply.

In the use and operation of this cutting machine, the bar B is moved endwise through the guide member 65 with the slide member 17 in an uppermost non-cutting position. The bar B is moved to engage one end thereof with the adjustable limit member 73. The hydraulic operator 109 may then be operated to lower the slide 17 with the cutters 43 rotating by operation of the motor 31. As the slide 17 moves downwardly, the roller 95 will rock the pressure bar 78 forwardly at its upper portion, the bar 78 rocking on the trunnions or pivot members 79. The forward rocking of the pressure bar 78 is effected by the roller 95 moving in the inclined cam track 97 and then engaging in the vertical cam track 96.

When the roller 95 is in the vertical cam track 96, the movable clamping members 60 will be tightly engaged with the bar and will force the bar into clamping engagement with the stationary clamping member 63. There will be cut off from the bar B as many pieces as there are cutting members 43 mounted on the shaft 24 and when the slide 17 is moved to its lowermost position, the bar will be completely severed and slide 17 may then be moved upwardly. Upward movement of the slide 17 with the cutters 43 will move the pressure bar 78 rearwardly to a pressure releasing position and to a position moving the clamping members 60 rearwardly to release the severed pieces. These severed pieces will then drop downwardly into a suitable collector or the like which may be disposed below the cutting members.

At the time the slide 17 starts downwardly to a cutting position and the pressure bar 78 is rocked forwardly, the locking member 102 will also be placed under a locking tension being moved forwardly by compression of the spring 108. This forward movement of the locking member 102 will lock the bar B against endwise movement during the cutting operation so that the bar will not be able to shift endwise while it is being severed by the cutting members 43.

What I claim:

1. A bar cutting machine comprising a supporting standard, a work clamping means carried by said support, rotary cutting means, means supporting said cutting means for movement toward or away from said clamping means, means correlated with said cutting means and said clamping means for moving the latter to clamping position simultaneously with movement of said cutting means toward the work and means operable by movement of said cutting means toward the work prior to the effectiveness of said clamping means for locking the work against endwise movement.

2. A bar cutting machine comprising a supporting standard, a work clamping means carried by said support, rotary cutting means, means supporting said cutting means for movement toward or away from said clamping means, means correlated with said cutting means and said clamping means for moving the latter to clamping position simultaneously with movement of said cutting means toward the work, said correlated means being so constructed and arranged as to positively move said clamping means to released position upon movement of said cutting means away from said clamping means, and means operable by movement of said cutting means toward the work prior to the effectiveness of said clamping means for locking the work against endwise movement.

3. A bar cutting machine comprising a supporting standard, a work clamping means carried by said support, rotary cutting means, means supporting said cutting means for movement toward or away from said clamping means, means correlated with said cutting means and said clamping means for moving the latter to clamping position upon movement of said cutting means toward the work, said correlated means being so constructed and arranged as to positively move said clamping means to released position upon movement of said cutting means away from said clamping means, said correlated means including tensionable means for placing said clamping means under a predetermined clamping tension, and means operable by movement of said cutting means toward the work prior to the effectiveness of said clamping means for locking the work against endwise movement.

4. A bar cutting machine comprising a supporting standard, a work clamping means carried by said support, rotary cutting means, means supporting said cutting means for movement toward or away from said clamping means, means correlated with said cutting means and said clamping means for moving the latter to clamping position simultaneously with movement of said cutting means toward the work, tensionable means for moving said clamping means toward the work and subsequently positively moving said clamping means away from the work, and means operable by movement of said cutting means toward the work prior to the effectiveness of said clamping means for locking the work against endwise movement.

5. A bar cutting machine comprising a supporting standard, a work clamping means carried by said support, rotary cutting means, means supporting said cutting means for movement toward or away from said clamping means, means correlated with said cutting means and said clamping means for moving the latter to clamping position simultaneously with movement of said cutting means toward the work, means for moving said cutting means toward or away from the work and means operable by movement of said cutting means toward the work for locking the work prior to engagement of said clamping means with the work.

6. A bar cutting machine comprising a supporting standard, a work clamping means carried by said support, rotary cutting means, means supporting said cutting means for movement toward or away from said clamping means, means correlated with said cutting means and said cutting means and said clamping means for moving the latter to clamping position upon movement of said cutting means toward the work, and tensionable work locking means engageable with the work adjacent one end of said clamping means.

7. In a bar cutting machine of that type including a reciprocating cutting means, a work clamping structure comprising a stationary base plate formed with spaced slots in which the cutting means is engageable, a depending stationary clamping jaw fixed to said base plate and offset from one edge thereof, said plate having spaced guide channels, a plurality of elongated movable clamping jaws in said guide channels, a common operator for said movable jaws, means supporting said operator for rocking movement, and correlated means partly carried by said operator and partly for connection with said cutting means for moving said movable jaws with reciprocation of said cutting means.

8. In a bar cutting machine of that type including a reciprocating cutting means, a work clamping structure comprising a stationary base plate formed with spaced slots in which the cutting means is engageable, a depending stationary clamping jaw fixed to said base plate and offset from one edge thereof, said plate having spaced guide channels, a plurality of elongated movable clamping jaws in said guide channels, a common operator for said movable jaws, means supporting said operator for rocking movement, correlated means partly carried by said operator and partly for connection with said cutting means for moving said movable jaws with reciprocation of said cutting means, and tensionable means interposed between said operator and said movable jaws for cushioning the movement of said movable jaws in one direction.

9. A bar cutting machine comprising a reciprocatory cutting means, a bar clamping means including a stationary clamping member and a movable clamping member, and cam means carried by said cutting means for moving said movable clamping member to clamping position upon movement of said cutting means to cutting position said cam means also positively moving said movable clamping member to released position upon movement of said cutting means away from the work.

10. A bar cutting machine comprising a reciprocatory cutting means, a bar clamping means including a stationary clamping member and a movable clamping member, a rockable operator for said movable clamping member, and cam means carried by said cutting means engageable with said operator for moving said movable clamping member simultaneously with movement of said cutting means.

11. A bar cutting machine comprising a reciprocatory cutting means, a bar clamping means including a stationary clamping member and a movable clamping member, a rockable operator for said movable clamping member, springs interposed between said operator and said clamping member for placing the latter under spring tension upon movement of said operator in one direction, and cam means carried by said cutting means engageable with said operator for moving said movable clamping member simultaneously with movement of said cutting means.

12. A bar cutting machine comprising a reciprocatory cutting means, a bar clamping means including a stationary clamping member and a movable clamping member, a rockable operator for said movable clamping member, springs interposed between said operator and said clamping member for placing the latter under spring tension upon movement of said operator in a direction to shift said movable clamping member to clamping position, and cam means carried by said cutting means engageable with said operator for moving said movable clamping member simultaneously with movement of said cutting means.

13. A bar cutting machine comprising a vertically reciprocable cutting means, a horizontal bar clamping means including a stationary clamping member and a movable clamping member, tensionable means for shifting said movable clamping member to clamping position, cam means fixed relative to and movable with said cutting means for shifting said movable clamping member simultaneously with reciprocation of said cutting means said tensionable means and said cam means being so arranged and constructed as to positively move said movable clamping member to released position, and means operable by movement of said cutting means toward the work prior to the effectiveness of said clamping means for locking the work against endwise movement.

14. A bar cutting machine comprising a vertically reciprocable cutting means, a horizontal bar clamping means including a stationary clamping member and a movable clamping member, tensionable means for shifting said movable clamping member to clamping position, and cam means fixed to said cutting means for shifting said movable clamping member simultaneously with reciprocation of said cutting means, said cam means including means for maintaining said movable clamping member in a clamping position during the period said cutting means is performing the cutting operation.

15. A bar cutting machine comprising a stationary support, a reciprocable cutting means carried by said support, a bar clamping means fixed to said support including a stationary clamping member and a movable clamping member, tensionable means correlated with said cutting means and said movable clamping member for holding the latter under tension when said cutting means is moving in a cutting direction, and correlated means carried partly by said support and partly by said stationary clamping member for locking the bar against endwise movement only when the cutting means is moving in a cutting direction.

HARVEY E. PRUITT.